United States Patent
Andersson

(10) Patent No.: US 10,444,826 B2
(45) Date of Patent: Oct. 15, 2019

(54) METHOD AND SYSTEM FOR ENABLING INTERACTION IN A TEST ENVIRONMENT

(71) Applicant: VOLVO CAR CORPORATION, Gothenburg (SE)

(72) Inventor: Patrik Andersson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 475 days.

(21) Appl. No.: 15/455,783

(22) Filed: Mar. 10, 2017

(65) Prior Publication Data

US 2017/0269681 A1 Sep. 21, 2017

(30) Foreign Application Priority Data

Mar. 18, 2016 (EP) .................................... 16161115

(51) Int. Cl.
*G06F 3/01* (2006.01)
*B60W 40/08* (2012.01)
(Continued)

(52) U.S. Cl.
CPC .............. *G06F 3/011* (2013.01); *B60W 40/08* (2013.01); *G06F 11/3664* (2013.01);
(Continued)

(58) Field of Classification Search
CPC ..... G06F 3/011; G06F 11/3664; B60W 40/08; G06C 5/008; G06T 19/006; G09B 9/04; G02B 27/017
See application file for complete search history.

(56) References Cited

U.S. PATENT DOCUMENTS

| 4,196,528 A | 4/1980 | Foerst |
| 6,950,788 B2 | 9/2005 | Faghri |
| 2002/0032553 A1* | 3/2002 | Simpson ................. A63F 13/08 703/8 |
| 2007/0136041 A1 | 6/2007 | Sheridan |

(Continued)

FOREIGN PATENT DOCUMENTS

CN 102495959 6/2012

OTHER PUBLICATIONS

Regenbrecht, Augmented Reality Projects in Automotive and Aerospace Industry, IEEE Computer Graphics and Applications, Nov./Dec. (Year: 2005).*
Park, Augmented Reality based on Driving Situation Awareness in Vehicle, IT Convergence Technology Research Laboratory, Electronics and Telecommunications Research Institute, Daejeon (Year: 2015).*

(Continued)

*Primary Examiner* — Michael J Dalbo
(74) *Attorney, Agent, or Firm* — Brooks Kushman P.C.

(57) ABSTRACT

An interaction test system provides a first virtual reality layer associated with a first test environment to a first test object and a second virtual reality layer associated with a second test environment to a second test object, such that a mixed reality perceived by the first and second test objects correspond. The system derives first object data including status information and/or actions of the first test object, provides first object behavior data to the second virtual reality layer such that status information and/or actions of the first object are included in the mixed reality perceived by the second object, derives second object data including status information and/or actions of the second test object, and provides second object behavior data to the first virtual reality layer such that status information and/or actions of the second object are included in the mixed reality perceived by the first object.

15 Claims, 7 Drawing Sheets

(51) Int. Cl.
  *G06F 11/36* (2006.01)
  *G07C 5/00* (2006.01)
  *G06T 19/00* (2011.01)
  *G02B 27/01* (2006.01)
  *G09B 9/04* (2006.01)
(52) U.S. Cl.
  CPC ............ *G07C 5/008* (2013.01); *G02B 27/017* (2013.01); *G06T 19/006* (2013.01); *G09B 9/04* (2013.01)

(56) References Cited

U.S. PATENT DOCUMENTS

2015/0331483 A1* 11/2015 Cieszkowski, III .. A63F 13/428
  345/156
2016/0019807 A1   1/2016 Uchida et al.

OTHER PUBLICATIONS

Bock, Vehicle in the Loop—Augunnented Reality Application for Collision Mitigation Systems, VRST '15 Proceedings of the 21st ACM Symposium on Virtual Reality Software and Technology (Year: 2015).*
European Patent Office, Summons to Attend Oral Proceeding pursuant to Rule 115(1) EPC, for counterpart European Application No. 16161115.7-1216 / 3220233, dated May 29, 2019.
European Patent Office, Communication from the Examining Division for related European Application Serial No. 16161115-1216, dated Oct. 5, 2018.
Stall et al. The national Advanced Driving Simulator Potential Application to ITS and AHS Research Jan. 15, 1996, XP 055299234, 15 Pages, "The national Advanced Driving Simulator Potential Application to ITS and AHS Research".
"Website https:///www.youtube.com/watch?v=Bi_GkdqON_s Youtube Video Dated Nov. 25, 2009, XP 054976759, 3 pages, "Plastic Pals: Toyota's Driving Simulator"."
Extend European Search Report for EP 16161115.7, completed by the European Patent Office dated Oct. 5, 2016 All together 13 Pages.

* cited by examiner

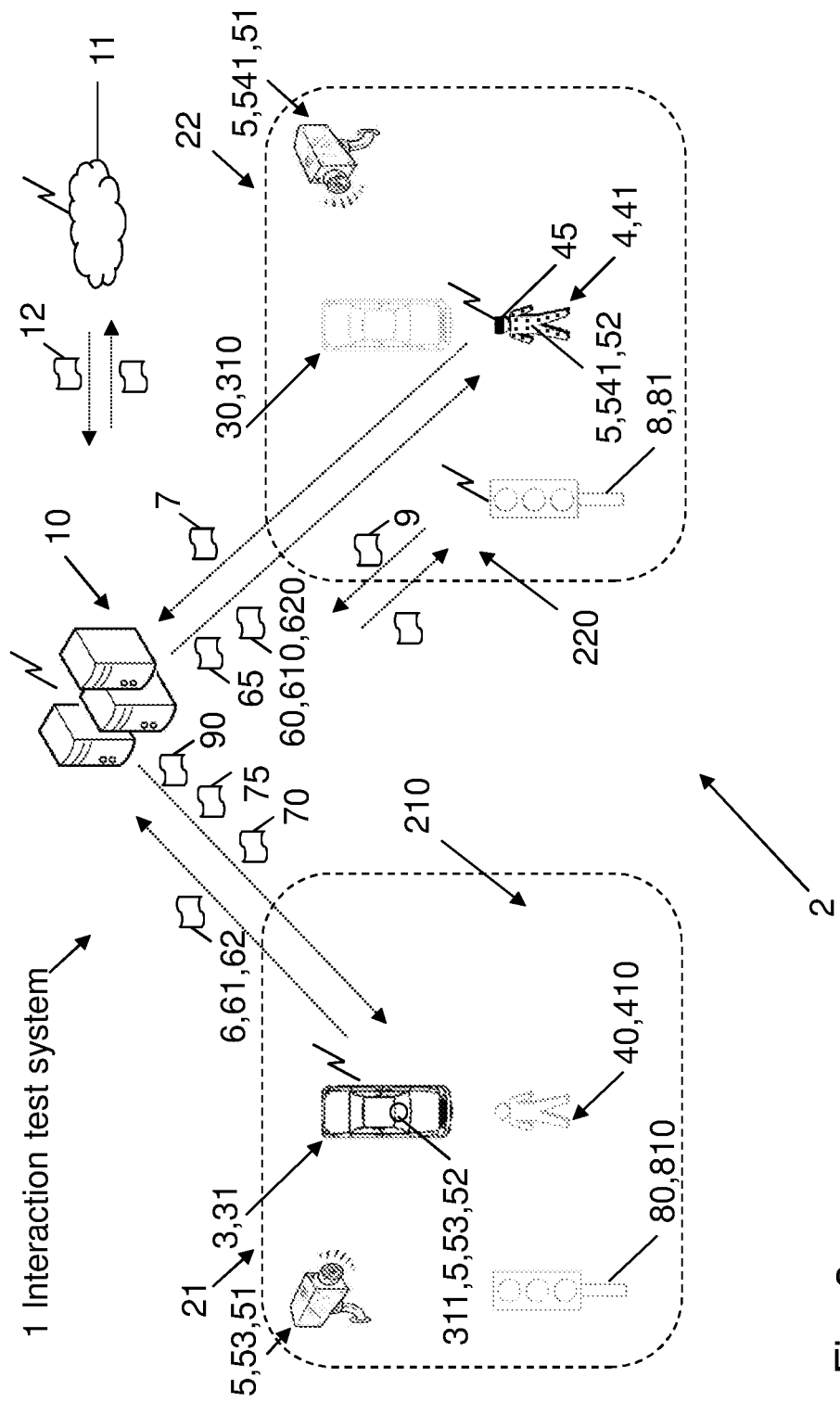

METHOD AND SYSTEM FOR ENABLING INTERACTION IN A TEST ENVIRONMENT

CROSS-REFERENCE TO RELATED APPLICATIONS

This application claims foreign priority benefits under 35 U.S.C. § 119(a)-(d) to European patent application number EP 16161115.7, filed Mar. 18, 2016 which is incorporated by reference in its entirety.

TECHNICAL FIELD

The present disclosure relates to an interaction test system and a method performed therein, for enabling safe interaction in a test environment between a first test object comprising a vehicle, and at least a second test object.

BACKGROUND

Since millions of motor vehicles are travelling along roads around the globe day and night, all year around, there is constantly an imminent risk of vehicle collisions involving a vehicle and other road users such as pedestrians, cyclists or other vehicles, etc. A vehicle collision may naturally result in body injuries and/or damage to the vehicle(s) and/or other road users involved. Thus, in striving to avoid vehicle collisions, motor vehicles may be at least partly autonomous and/or provided with driver assistance systems. These systems may monitor the surroundings of the vehicle, decide whether a collision with an object is likely to occur, and further warn and/or intervene with e.g. the steering system and/or the brake system of the vehicle in order to prevent an impending or probable collision. For instance, when a vehicle enters e.g. a city, it is crucial that the vehicle interacts correctly and/or desirably with vulnerable road users (VRUs)—such as e.g. pedestrians—to avoid critical situations. In order for driver assistance systems to function desirably, functions and/or parameters associated with active safety need to be configured and/or tuned in a suitable manner. The vehicle may however be involved in a vast variety of potential collisions and/or impending collisions, and it may accordingly be challenging to anticipate suitable configuration and/or tuning of said functions and/or parameters, for different collision scenarios. Thus, in order to determine proper or desirable settings, test sessions involving different traffic scenarios are commonly carried out. Such test sessions, however, tend to be complicated and/or expensive, especially when involving high-risk scenarios. Should a traffic scenario moreover involve a VRU, then the test session would furthermore be risky and/or dangerous especially to the VRU. Accordingly, it is further commonly known to simulate different traffic scenarios digitally. U.S. Pat. No. 6,950,788, for instance, relates to such a computer-implemented system and method. However, although U.S. Pat. No. 6,950,788 discloses a model that simulates motor vehicle traffic, as well as bicycle and pedestrian traffic, the challenge to, in a satisfying manner, configure and/or tune functions and/or parameters associated with active safety, remains.

SUMMARY

It is therefore an object of embodiments herein to provide an alternative approach of enabling interaction in a test environment between a first test object comprising a vehicle, and at least a second test object. According to a first embodiment herein, the object is achieved by a method according to claim 1. The technical features and corresponding advantages of said method will be discussed in further detail in the following.

By introducing a method performed by an interaction test system for enabling interaction in a test environment between a first test object comprising a vehicle, and at least a second test object adapted to communicate directly or indirectly with the first test object, an approach is provided which enables testing, e.g. of high risk scenarios, involving a test vehicle and one or more other test objects. "Interaction" may refer to "safe and/or contact-free interaction" and/or "interaction without physical contact", whereas "enabling" interaction may refer to "supporting, providing, monitoring, evaluating, analyzing and/or studying" interaction. The "test environment" may refer to a "test facility" and/or "test site" and further be physical and/or digital. The "vehicle"—which may be a "test vehicle"—may refer to any arbitrary vehicle, for instance an engine-propelled vehicle such as e.g. a car, truck, lorry, van, bus, motorcycle, etc. The vehicle—which may comprise a positioning system—may support one or more driving assistance functions, e.g. driving assistance functions related to active safety, such as collision avoidance. According to an example, "vehicle" may thus refer to "vehicle supporting one or more driving assistance functions". Additionally, or alternatively, the vehicle may be represented by a vehicle supporting partially autonomous, semi-autonomous and/or fully autonomous driving. Furthermore, the at least second "test object" may refer to any physical object of interest in a test scenario with the first test object, and may thus e.g. refer to any arbitrary "road user", for instance represented by and/or comprising a human, such as a pedestrian, cyclist or the like, an animal, and/or other vehicle(s). It should be noted that the expression "test object" may mean one or more such "road users". The expression "adapted to communicate" may refer to "adapted to communicate wirelessly, e.g. via WiFi or the like, or an equivalent or successor thereof", and/or "adapted such that information and/or data may be transferred between said first and said at least second test object". Moreover, "indirectly" may refer to "via a remote control server". Furthermore, the "interaction test system" may fully and/or at least partly be comprised in said control server, and/or further be distributed between said first and/or at least second test object.

Since, during a test session, the first test object acts within a first physical test environment and the at least second test object acts within at least a second physical test environment physically separated from the first test environment, the first test object and the at least second test object are physically separated from one another during the test session. Accordingly, test scenarios may be carried out without the first test object and the at least second object having physical contact. "Test session" may refer to "test scenario", whereas the expression that an object "acts" within a physical test environment throughout this disclosure may refer to that an object "participates in the test session", "is situated" and/or "moves" within a physical test environment. The "first physical test environment" may refer to the "first physical test environment of the test environment", whereas the "second physical test environment" may refer to the "second physical test environment of the test environment". Moreover, the first and/or the at least second "physical test environment" may refer to a respective—e.g. restricted—arbitrary area, such as e.g. a test track, an essentially open area, site and/or field, an indoor facility and/or room, or the like. The characteristics such as structure, disposition, size, range, and/or dimensions of a physical test environment may vary e.g. with the conditions at hand, and may e.g. range from a few meters and/or square meters up to thousands of kilometers and/or square kilometers. Moreover, the characteristics of the first physical test environment may differ—even greatly—from those of the at least second physical test environment; the first physical test environment may for instance be represented by a test track whereas the second physical test environment for instance may be represented by an indoor essentially empty room. Furthermore, the expression "physically separated" may refer to "physically separated by at least a minimum distance and/or safe distance", which distance may vary with the conditions at hand, e.g. range from essentially zero meters should the first and the at least second physical test environments be separated by means of e.g. a wall and/or fence or the like, up to an essentially unlimited distance, e.g. thousands of kilometers.

Since the interaction test system provides a first virtual reality layer associated with the first test environment, to the first test object, and at least a second virtual reality layer associated with the at least second test environment, to the at least second test object, such that a mixed reality perceived by the first test object corresponds to a mixed reality perceived by the at least second test object, a first set of information such as data, graphics and/or sound etc. may be overlaid on the first test environment from a point of view of the first test object and at least a second set of information on the at least second test environment from a point of view of the at least second test object, such that the first and the at least second test objects—and/or users thereof—experience a similar "reality". The first virtual reality layer may thus differ from the at least second virtual reality layer in that the characteristics of the first physical test environment may differ from the characteristics of the at least second physical test environment. "Mixed reality", as commonly known in the art, may refer to overlaying information on the real world, such that a "digital world" is blended with the real physical world, thus a mix and/or merge of virtual reality and reality. Thus, "mixed reality"—sometimes referred to as "hybrid reality"—is commonly known to refer to the merging of real and virtual worlds to produce new environments and visualizations where physical and digital objects coexist and interacts in real time. The expression "virtual reality layer"—which may refer to "virtual reality" which in a similar manner is known in the art—may comprise information for instance rendering or providing a specific traffic environment and/or traffic situation. A virtual reality layer "associated with" a test environment, may refer to a virtual reality layer "overlaid on" and/or "based on" a test environment. Moreover, "providing" a virtual reality layer may refer to "applying", "enabling", "submitting" and/or "providing by means of said control server" a virtual reality layer, whereas providing "to the test object" may refer to providing "to a virtuality handling unit associated with and/or comprised in said test object, which virtuality handling unit may be adapted to receive, interpret and/or derive information from said virtual reality layer". Said optional "virtuality handling unit" may be comprised in the test object; additionally, or alternatively the "virtuality handling unit" may be positioned remote from the test object in wireless connection therewith, for instance be comprised in and/or be represented by an arbitrary electronic unit such as e.g. one or more of an electronic control unit (ECU), a laptop and/or a smartphone. Furthermore, the expression "perceived by the test object" may refer to "perceived by said virtuality handling unit" and/or "perceived by a user of said test object". "Corresponds to" may refer to "essentially corresponds to", and moreover to "is equivalent to", "mirrors", "matches", "coincides with" and/or "is associated with".

Since the interaction test system moreover derives, continuously, periodically, or intermittently, first object data associated with the first test object, which first object data comprises status information and/or actions of the first test object, information relating to a current status of the first test object and/or information relating to how said first test object acts—e.g. behaves and/or interacts during the test session—is essentially constantly monitored. The expression object data "associated with" the test object may throughout this disclosure refer to object data "of" the test object, whereas the expression "object data" throughout this disclosure may refer to "relevant object data", "active safety related object data", "driver assistance related object data" and/or "current object data". Moreover, "data" may throughout this disclosure refer to "information", "parameters" and/or "attributes". "Status information" may throughout refer to "current status information", "relevant status information", "active safety related status information", "driver assistance related status information" and/or "parameters", whereas "actions of" the test object throughout may refer to "actions performed by", "steps", "activity", "behavior" and/or "driving behavior" of the test object. The "status information" and/or "actions" may accordingly throughout this disclosure refer to status information and/or actions relating to e.g. geographical position, speed, direction, sounds, indicators, horn, lights, braking lights, braking, brake force, steering, steering wheel angle, etc. "Deriving" object data may throughout refer to "receiving", "tracking" and/or "monitoring" object data, e.g. with support from one or more sensors on-board the test object and/or at least one vision sensor adapted to externally monitor the test object, such as a camera. Such one or more vision sensor(s) may be arbitrarily positioned and/or movable within the test environment, for instance observing the test object(s) from a distance, and/or being positioned on and/or on-board the test object. The object data may further be submitted, sent and/or provided to the control server discussed above. "Deriving object data" may hence throughout this disclosure be preceded by an action step "monitoring object data", and may furthermore refer to "deriving object data by means of said control server". The expression "continuously, periodically, or intermittently" may throughout refer to "during said test session, continuously, periodically, or intermittently".

Since the interaction test system further provides continuously, periodically, or intermittently, first object behavior data based on the first object data, to the at least second virtual reality layer, such that at least a portion of the status information and/or actions of the first test object, are comprised in the mixed reality perceived by the at least second test object, the virtual reality layer of the second test object incorporates the first test object and—essentially constantly—at least partly its status and/or actions, such that the second test object—and/or a user or occupant thereof—accordingly experiences, via said mixed reality, a virtual replica of the first test object and the status and/or actions thereof. The at least second test object—and/or a user or occupant thereof—thus interacts with the virtual replica of the first test object during the test session, and may hence base upcoming acting and/or behavior during the test session on the behavior of the first test object, i.e. based on the first object behavior data. The expression "object behavior data" may throughout this disclosure refer to "data relating to status and/or actions of the test object", whereas "at least a portion" throughout may refer to "one or more pieces and/or parameters". Furthermore "providing" object behavior data may throughout this disclosure refer to "submitting", "sending" and/or "providing by means of said control server" object behavior data, whereas the expression "based on" the object data throughout may refer to "derived from" the object data.

Moreover, since the interaction test system derives, continuously, periodically, or intermittently, at least second object data associated with the at least second test object, which at least second object data comprises status information and/or actions of the at least second test object, information relating to a current status of the at least second test object and/or information relating to how said at least second test object acts—e.g. behaves and/or interacts during the test session—is essentially constantly monitored.

Since the interaction test system further provides, continuously, periodically, or intermittently, at least second object behavior data based on the at least second object data, to the first virtual reality layer, such that at least a portion of the status information and/or actions of the at least second test object are comprised in the mixed reality perceived by the first test object, the virtual reality layer of the first test object incorporates the at least second test object and—essentially constantly—at least partly its status and/or actions, such that the first test object—and/or a user or occupant thereof—accordingly experiences, via said mixed reality, a virtual replica of the at least second test object and the status and/or actions thereof. The first test object—and/or a user or occupant thereof—thus interacts with the virtual replica of the at least second test object during the test session, and may hence base upcoming acting and/or behavior during the test session on the behavior of the at least second test object, i.e. based on the at least second object behavior data. Consequently, with the introduced approach, the first and at least second test object may interact with one another throughout the test session without risking physical contact. Thus, complex and/or high risk test scenarios may be carried out in a safe manner, for instance test sessions relating to collisions and/or imminent collisions.

Optionally, the interaction test system may visualize the test session at least in part on one or more displays associated with the control server discussed above. The test session may thereby be at least partly followed, studied and/or evaluated visually by e.g. a test operator and/or test coordinator. Input to visualization of the test session may comprise at least digital representations of the first and/or at least second physical test environment, and further be based on the continuously, periodically, or intermittently derived first and/or at least second object data.

Moreover, optionally, the interaction test system may initiate the test session. "Initiating" may for instance refer to "enabling", "joining" and/or "initiating by means of said control server". Initiating the test session may further optionally comprise providing—e.g. by means of the control server—one or more initial action instructions to the first and/or at least second test object. An "action instruction" may throughout this disclosure for instance refer to an instruction relating to and/or insinuating a geographical position, a route, a speed, indicating, honking, using lights and/or headlights, etc., and may furthermore involve a parameter of the "status information" discussed above Optionally, the interaction test system further determines an interaction behavior of the first test object and/or the at least second test object, based on the derived first object data and/or the derived at least second object data. Then, based on the interaction behavior, the interaction test system furthermore provides an action instruction to the first and/or the at least second test object. Thereby, by evaluating the interaction between the first test object and the at least second test object—in view of either of, or all of, the test objects—one or more action instructions may be given to one or more of the test objects, instructing the same to act in accordance with the action instruction, for instance to change route, activate headlights, etc. Accordingly, depending on how a test object acts and/or interacts during the test session, new and/or updated action instructions may be given, e.g. during the ongoing test session. "Interaction behavior" of the test object may refer to "acting" of the test object, whereas the expression "based on" the object data throughout the disclosure may refer to "derived from" the object data. "Determining" the interaction behavior may refer to "evaluating", "deriving", "monitoring", "studying" and/or "determining by means of said control server" the interaction behavior. Moreover, "providing" an action instruction may refer to "transmitting", "submitting", "sending", "providing during said test session" and/or "providing by means of said control server" an action instruction. Additionally, or alternatively, based on the optionally determined interaction behavior, the test interaction system furthermore adapts a data parameter of the first and/or at least second test object, which data parameter is associated with driving assistance functionality. Thereby, by evaluating the interaction between the first test object and the at least second test object—in view of either of, or all of, the test objects—one or more data parameters related to driving assistance functionality of one or more of the test objects, may be adapted, for instance steering angle, braking force, activation of honking, etc. Accordingly, depending on how a test object acts and/or interacts during the test session, data parameters of the same or another test object may be configured, e.g. during the ongoing test session. According to an example, a data parameter may be adapted in a self-learning manner. The expression data "parameter" may refer to data "attribute", whereas "data parameter" may refer to "data parameter associated with active safety and/or driving assistance functionality". A data parameter may accordingly be represented by a parameter associated with braking, steering, honking, indicating, using lights and/or headlights etc., and may further involve a parameter of the "status information" discussed above. Moreover, "adapting" a data parameter may refer to "configuring", "adapting by means of said control server" and/or "initiating adapting" a data parameter.

Optionally, the first test object may additionally comprise a vehicle occupant. Providing the first virtual reality layer then comprises providing a first vehicle virtual reality layer to the vehicle and/or a first occupant virtual reality layer to a head-mounted display (HMD) carried by the vehicle occupant. Moreover, deriving first object data then comprises deriving vehicle data from the vehicle, and/or occupant data from a first motion capture system carried by, and/or visually sensing, the vehicle occupant. The vehicle data comprises status information and/or actions of the vehicle and the occupant data comprises status information and/or actions of the vehicle occupant. Furthermore, providing first object behavior data then comprises providing vehicle behavior data based on the vehicle data and/or occupant behavior data based the occupant data, to the at least second virtual reality layer, such that at least a portion of the status information and/or actions of the vehicle and/or the vehicle occupant, are comprised in the mixed reality perceived by the at least second test object. Moreover, providing at least second object behavior data then comprises providing at least second object behavior data based on the at least second object data, to the first vehicle virtual reality layer and/or the first occupant virtual reality layer, such that at least a portion of the status information and/or actions of the at least second test object are comprised in the mixed reality perceived by the vehicle and/or in the mixed reality perceived by the vehicle occupant. Thereby, by the first object additionally comprising a vehicle occupant such as a driver, for instance in a scenario with a not fully autonomous vehicle, said vehicle occupant is considered a participant in the test session in that the status and/or actions of the first test object during the test session may be pertinent the vehicle occupant. Thus, thereby, by providing the first virtual reality layer then comprising providing a first vehicle virtual reality layer to the vehicle and/or a first occupant virtual reality layer to a HMD carried by the vehicle occupant, a respective virtual reality layer is provided to the vehicle and/or the vehicle occupant such that a mixed reality perceived by the vehicle and/or a mixed reality perceived by the vehicle occupant, correspond to a mixed reality perceived by the at least second test object. Thus, a first vehicle set of information may be overlaid on the first test environment from a point of view of the vehicle, and/or a first occupant set of information may be overlaid on the first test environment from a point of view of the vehicle occupant, such that the vehicle—and/or the vehicle occupant—and the at least second test object, experience a similar "reality". The first vehicle virtual reality layer may differ from the first occupant virtual reality layer. It may be noted that the first vehicle set of information—or the first occupant set of information—may refer to the first set of information discussed above. It may similarly be noted that the first vehicle virtual reality layer—or the first occupant virtual reality layer—may refer to the previously discussed first virtual reality layer. A head-mounted display—which is commonly known in the art—provides the virtual reality information, such that a user thereof—e.g. the vehicle occupant—may experience a mixed reality, i.e. a virtual reality overlaid the real world e.g. the first physical test environment. A HMD may further throughout this disclosure be represented by a commonly known optical HMD (OHMD), which allows the user—e.g. the vehicle occupant—to see through it. The expression of providing a virtual reality layer "to the vehicle" may refer to providing a virtual reality layer "to a virtuality handling unit associated with the vehicle", whereas the expression of providing a virtual reality layer "to a HMD" may refer to providing a virtual reality layer to a virtuality handling unit associated with a HMD". The HMD may support wireless communication, and may further communicate with the control server discussed above directly and/or via said virtuality handling unit associated with the HMD. Moreover, thereby, by deriving first object data then comprising deriving—continuously, periodically, or intermittently—vehicle data from the vehicle—which vehicle data comprises status information and/or actions of the vehicle—and/or occupant data from a first motion capture system carried by, and/or visually sensing, the vehicle occupant—which occupant data comprises status information and/or actions of the vehicle occupant—information relating to a current status of the vehicle and/or information relating to how the vehicle acts, and/or information relating to a current status of the vehicle occupant and/or information relating to how the vehicle occupant acts, are essentially constantly monitored. The expression "vehicle data" may refer to the "object data" discussed above, whereas "occupant data" throughout this disclosure may refer to "relevant occupant data", "safety related occupant data" and/or "current occupant data". "Status information" may here additionally refer to "safety related occupant status information" and/or "occupant status information", whereas "actions of" here additionally may refer to "occupant behavior". The "status information" and/or "actions" may accordingly here additionally refer to information and/or actions relating to occupant geographical position, occupant eye position, occupant head position, occupant hand position, occupant movement, occupant sounds, etc. A "motion capture system" may throughout this disclosure refer to any commonly known arbitrary motion capture system, such as a motion capture system comprising a plurality of motion sensors carried e.g. worn by a user—e.g. the vehicle occupant—commonly referred to as a motion tracking system. Additionally, or alternatively, a motion capture system may further throughout refer to one or more commonly known vision sensors, e.g. cameras, visually monitoring the test object, e.g. the vehicle occupant. Such a visually monitoring motion capture system may be positioned on-board and/or on the test object—such as on-board the vehicle and/or on the vehicle occupant—and/or at any arbitrary position(s) and/or moving position(s) within a physical test environment, for instance the first test environment, thus monitoring the test object—e.g. the vehicle occupant—from a distance. Moreover, thereby, by providing first object behavior data then comprising—continuously, periodically, or intermittently—providing vehicle behavior data based on the vehicle data and/or occupant behavior data based on the occupant data, to the at least second virtual reality layer, such that at least a portion of the status information and/or actions of the vehicle and/or the vehicle occupant, are comprised in the mixed reality perceived by the at least second test object, the virtual reality layer of the second test object incorporates the vehicle and/or the vehicle occupant and—essentially constantly—at least partly the vehicle's and/or the vehicle occupant's status and/or actions, such that the second test object accordingly experiences, via said mixed reality, a virtual replica of the vehicle and/or the vehicle occupant and the status and/or actions thereof. The at least second test object thus interacts with the virtual replica of the vehicle and/or vehicle occupant during the test session, and may hence base upcoming acting and/or behavior during the test session on the behavior of the vehicle and/or vehicle occupant, i.e. based on the vehicle behavior data and/or the occupant behavior data. The expression "vehicle behavior data" may throughout this disclosure refer to "data relating to status and/or actions of the vehicle", whereas the expression "occupant behavior data" throughout may refer to "data relating to status and/or actions of the vehicle occupant". Moreover, thereby, by providing at least second object behavior data then comprising providing—continuously, periodically, or intermittently—at least second object behavior data based on the at least second object data, to the first vehicle virtual reality layer and/or the first occupant virtual reality layer, such that at least a portion of the status information and/or actions of the at least second test object are comprised in the mixed reality perceived by the vehicle and/or in the mixed reality perceived by the vehicle occupant, the vehicle virtual reality layer—and/or the occupant virtual reality layer—incorporates the at least second test object and—essentially constantly—at least partly its status and/or actions, such that the vehicle—and/or the vehicle occupant—accordingly experiences, via respective mixed reality, a virtual replica of the at least second test object and the status and/or actions thereof. The vehicle—and/or the vehicle occupant—thus interacts with the virtual replica of the at least second test object during the test session, and may hence base upcoming acting and/or behavior during the test session on the behavior of the at least second test object, i.e. based on the at least second object behavior data.

Optionally, the second test object comprises a vulnerable road user (VRU). Providing the at least second virtual reality layer then comprises providing a VRU virtual reality layer to an HMD carried by the VRU, and deriving at least second object data then comprises deriving the second object data from a VRU motion capture system carried by, and/or visually sensing, the VRU. Thereby, by the second test object comprising a VRU, test scenarios commonly considered for instance too stressful, uncomfortable and/or risky to the VRU, may now be carried out in a safe manner. Accordingly, a high risk scenario involving a VRU—traditionally not possible to fully carry out—may now be comprised in the test session. Moreover, thereby, by providing the at least second virtual reality layer then comprising providing a VRU virtual reality layer to an HMD carried by the VRU, a mixed reality perceived by the first test object corresponds to a mixed reality perceived by the HMD—or the VRU. Thus, a VRU set of information may be overlaid on the second test environment from a point of view of the HMD and/or the VRU, such that the first test object and/or a user or occupant thereof, and the HMD and/or the VRU, experience a similar "reality". It may be noted that the VRU set of information may refer to the second set of information discussed above; it may similarly be noted that the VRU virtual reality layer may refer to the previously discussed second virtual reality layer. The "VRU" may refer to any arbitrary vulnerable road user, for instance a pedestrian, a pedestrian with a stroller or the like, a cyclist, a motorcyclist, a moped rider, a Segway® rider, etc. The HMD carried by the VRU may refer to a HMD similar to that discusses above. Moreover, thereby, by deriving at least second object data then comprising deriving—continuously, periodically, or intermittently—the second object data from a VRU motion capture system carried by, and/or visually sensing, the VRU, information relating to a current status of the VRU and/or information relating to how the VRU acts, is essentially constantly monitored. The expression "object data" may here additionally refer to "VRU data", "relevant VRU data", "safety related VRU data" and/or "current VRU data". "Status information" may here additionally refer to "safety related VRU status information" and/or "VRU status information", whereas "actions of" here additionally may refer to "VRU behavior". The "status information" and/or "actions" may accordingly here additionally refer to information and/or actions relating to VRU geographical position, VRU eye position, VRU head position, VRU hand position, VRU movement, VRU sounds, etc. The "motion capture system" may refer to a motion capture system similar to that discusses above. Accordingly, the virtual reality layer of the HMD incorporates the first test object and—essentially constantly—at least partly the first test object's status and/or actions, such that the HMD—and/or VRU—accordingly experiences, via the mixed reality, a virtual replica of the first test object and the status and/or actions thereof. The HMD—and/or the VRU—thus interacts with the virtual replica of the first test object during the test session, and may hence base upcoming acting and/or behavior during the test session on the behavior of the first test object, i.e. based on the first object behavior data. The expression "object behavior data" may here additionally refer to "data relating to status and/or actions of the VRU". Moreover, accordingly, the virtual reality layer of the first test object incorporates the VRU and—essentially constantly—at least partly its status and/or actions, such that the first test object—and/or a user thereof—accordingly experiences, via the mixed reality, a virtual replica of the VRU and the status and/or actions thereof. The first test object thus interacts with the virtual replica of the VRU during the test session, and may hence base upcoming acting and/or behavior during the test session on the behavior of the VRU, i.e. based on the second object behavior data.

Optionally, the second test object comprises a vehicle—throughout referred to as a "second vehicle"—and a vehicle occupant thereof. Providing the at least second virtual reality layer then comprises providing a second vehicle virtual reality layer to the second vehicle and/or a second occupant virtual reality layer to an HMD carried by the vehicle occupant of the second vehicle. Moreover, providing first object behavior data then comprises providing first object behavior data based on the first object data, to the second vehicle virtual reality layer and/or the second occupant virtual reality layer, such that at least a portion of the status information and/or actions of the first test object, is comprised in the mixed reality perceived by the second vehicle and/or in the mixed reality perceived by the HMD carried by the vehicle occupant of the second vehicle. Moreover, deriving at least second object data then comprises deriving second vehicle data from the second vehicle, and/or second occupant data from a second motion capture system carried by, and/or visually sensing, the vehicle occupant of the second vehicle. The second vehicle data comprises status information and/or actions of the second vehicle and the second occupant data comprising status information and/or actions of the second vehicle occupant. Moreover, providing at least second object behavior data then comprises providing second vehicle behavior data based on the second vehicle data and/or second occupant behavior data based on the second occupant data, to the first virtual reality layer, such that at least a portion of the status information and/or actions of the second vehicle and/or the second occupant, are comprised in the mixed reality perceived by the first test object. Thereby, by the second test object comprising a second vehicle and a vehicle occupant thereof, such as a driver, said second vehicle and/or the vehicle occupant thereof is considered a participant in the test session in that the status and/or actions of the second test object during the test session may be pertinent either or both of the second vehicle and the vehicle occupant thereof. Moreover, thereby, by providing the at least second virtual reality layer then comprising providing a second vehicle virtual reality layer to the second vehicle and/or a second occupant virtual reality layer to an HMD carried by the vehicle occupant of the second vehicle, a respective virtual reality layer is provided to the second vehicle and/or the second vehicle occupant such that a mixed reality perceived by the second vehicle and/or a mixed reality perceived by the second vehicle occupant, correspond to a mixed reality perceived by the first test object. Thus, a second vehicle set of information may be overlaid on the second test environment from a point of view of the second vehicle, and/or a second occupant set of information may be overlaid on the second test environment from a point of view of the second vehicle occupant, such that the second vehicle—and/or the second vehicle occupant—and the first test object, experience a similar "reality". The second vehicle virtual reality layer may differ from the second occupant virtual reality layer. It may be noted that the second vehicle set of information—or the second occupant set of information—may refer to the second set of information discussed above. It may similarly be noted that the second vehicle virtual reality layer—or the second occupant virtual reality layer—may refer to the previously discussed second virtual reality layer. The HMD carried by the second vehicle occupant may refer to an HMD similar to that discussed above. Moreover, thereby, by providing first object behavior data then comprising providing—continuously, periodically, or intermittently—first object behavior data based on the first object data, to the second vehicle virtual reality layer and/or the second occupant virtual reality layer, such that at least a portion of the status information and/or actions of the first test object, is comprised in the mixed reality perceived by the second vehicle and/or in the mixed reality perceived by the HMD carried by the vehicle occupant of the second vehicle, the second vehicle virtual reality layer and/or the second occupant virtual reality layer then incorporates the first test object and—essentially constantly—at least partly the first test object's status and/or actions, such that the second vehicle—and/or the second vehicle occupant—accordingly experiences, via a respective mixed reality, a virtual replica of the first test object and the status and/or actions thereof. The second vehicle—and/or the second vehicle occupant—thus interacts with the virtual replica of the first test object during the test session, and may hence base upcoming acting and/or behavior during the test session on the behavior of the first test object, i.e. based on the first object behavior data. Moreover, thereby, by deriving at least second object data then comprises deriving—constantly, periodically, or intermittently—second vehicle data from the second vehicle, which second vehicle data comprises status information and/or actions of the second vehicle, and/or second occupant data from a second motion capture system carried by, and/or visually sensing, the vehicle occupant of the second vehicle, which second occupant data comprises status information and/or actions of the second vehicle occupant, information relating to a current status of the second vehicle and/or information relating to how the second vehicle acts, and/or information relating to a current status of the second vehicle occupant and/or information relating to how the second vehicle occupant acts, are essentially constantly monitored. The "motion capture system" may refer to a motion capture system similar to that discusses above. Moreover, thereby, by providing at least second object behavior data then comprising—continuously, periodically, or intermittently—providing second vehicle behavior data based on the second vehicle data and/or second occupant behavior data based on the second occupant data, to the first virtual reality layer, such that at least a portion of the status information and/or actions of the second vehicle and/or the second occupant, are comprised in the mixed reality perceived by the first test object, the first virtual reality layer incorporates the second vehicle and/or the second vehicle occupant and—essentially constantly—at least partly its respective status and/or actions, such that the first test object accordingly experiences, via its mixed reality, a virtual replica of the second vehicle and/or the second vehicle occupant and the status and/or actions thereof. The first test object thus interacts with the virtual replica of the second vehicle and/or the second vehicle occupant during the test session, and may hence base upcoming acting and/or behavior during the test session on the behavior of the second vehicle and/or second vehicle occupant, i.e. based on the second vehicle behavior data and/or second occupant behavior data.

Optionally—during the test session—at least a first auxiliary object acts within the first and/or the at least second physical test environment, which at least first auxiliary object is adapted to communicate directly or indirectly with the first test object and/or the at least second test object. The interaction test system then derives—e.g. continuously, periodically, or intermittently—auxiliary object data associated with the at least first auxiliary object, which auxiliary object data comprises status information and/or actions of the auxiliary object. The interaction test system then moreover provides auxiliary object behavior data based on the auxiliary object data, to the first and/or the at least second virtual reality layer, such that at least a portion of the status information and/or actions of the at least first auxiliary object are comprised in the mixed reality perceived by the first test object and/or in the mixed reality perceived by the at least second test object. Thereby, by at least a first auxiliary object acting within the first and/or the at least second physical test environment, which at least first auxiliary object is adapted to communicate directly or indirectly with the first test object and/or the at least second test object, one or more auxiliary objects—such as e.g. commonly known traffic light arrangements, traffic sign arrangement and/or moveable robots—able to communicate e.g. wirelessly for instance with the control server discussed above, may participate in the test session. The at least first auxiliary object may further optionally be controlled, e.g. by said control server. A "movable robot" may refer to a commonly known robotized vehicle. Moreover, thereby, since the interaction test system then derives—e.g. continuously, periodically, or intermittently—auxiliary object data associated with the at least first auxiliary object, which auxiliary object data comprises status information and/or actions of the auxiliary object, information relating to a status—e.g. current status—of the at least first auxiliary object and/or information relating to how the auxiliary object acts, is monitored, e.g. essentially constantly monitored. The expression "object data" may here additionally refer to "auxiliary data", "relevant auxiliary data", "safety related auxiliary data" and/or "current auxiliary data". "Status information" may here additionally refer to "safety related auxiliary status information" and/or "auxiliary status information", whereas "actions of" here additionally may refer to "auxiliary object behavior". The "status information" and/or "actions" may accordingly here additionally refer to information and/or actions relating to auxiliary object geographical position, auxiliary object direction, auxiliary object speed, auxiliary object movement, auxiliary object light colour, auxiliary object sounds, etc. Moreover, thereby, by the interaction test system then moreover providing—e.g. constantly, periodically, or intermittently—auxiliary object behavior data based on the auxiliary object data, to the first and/or the at least second virtual reality layer, such that at least a portion of the status information and/or actions of the at least first auxiliary object are comprised in the mixed reality perceived by the first test object and/or in the mixed reality perceived by the at least second test object, the virtual reality layer of the first test object and/or the virtual reality layer of the at least second test object respectively incorporates the at least first auxiliary test object and—e.g. essentially constantly—at least partly the auxiliary test object's status and/or actions, such that the first test object and/or the at least second test object accordingly experiences, via respective mixed reality, a virtual replica of the at least first auxiliary test object and the status and/or actions thereof. The first test object and/or the at least second test object thus interacts with the virtual replica of the at least first auxiliary test object during the test session, and may hence base upcoming acting and/or behavior during the test session on the behavior of the at least first auxiliary test object, i.e. based on the auxiliary object behavior data. Consequently, the first and/or at least second test object may interact with one or more auxiliary test objects throughout the test session. The expression "object behavior data" may here additionally refer to "data relating to status and/or actions of the at least first auxiliary object".

Optionally, the interaction test system derives environment conditions data from a cloud service, which environment conditions data comprises one or more environment conditions associated with the first and/or at least second physical test environment. The interaction test system then moreover provides—at least a portion of—the environment conditions data to the first test object, the first virtual layer, the at least second test object and/or the at least second virtual layer, such that—at least a portion of—the environment conditions data are comprised in the mixed reality perceived by the first test object and/or in the mixed reality perceived by the at least second test object. Thereby, by the interaction test system deriving environment conditions data from a cloud service, which environment conditions data comprises one or more environment conditions associated with the first and/or at least second physical test environment, external input holding information with regards to e.g. a road condition or weather condition relevant for the first and/or second physical test environment, may be taken into account in the test session. The expression "environment conditions data" may refer to "surroundings conditions data", "environment status data", "environment conditions input" and/or "environment conditions information", whereas "environment conditions associated with" a physical test environment may refer to "environment conditions potentially applicable for, valid for and/or of interest to" a physical test environment. A "cloud service" may refer to a commonly known cloud service, capable of collecting and distributing information from plural users thereof, such as e.g. vehicles and/or vehicle occupants. The cloud service may moreover refer to a faked cloud service and/or a crowdsourcing cloud service. Moreover, thereby, by the interaction test system then moreover providing the environment conditions data to the first test object, the first virtual layer, the at least second test object and/or the at least second virtual layer, such that the environment conditions data are comprised in the mixed reality perceived by the first test object and/or in the mixed reality perceived by the at least second test object, the first test object, the virtual reality layer of the first test object, the at least second test object and/or the virtual reality layer of the at least second test object may respectively incorporate the environment conditions data. The first test object and/or the at least second test object may thus act taking into account the environment conditions data during the test session, regardless of whether or not said environment conditions data is applicable for the ego physical test environment, and may hence base upcoming acting and/or behavior during the test session on the environment conditions data. Consequently, the first and/or at least second test object may interact throughout the test session, additionally taking into account the environment conditions data. "Deriving environment conditions data" may refer to "deriving environment conditions data by means of said control server"; similarly, "providing environment conditions data" may refer to "providing environment conditions data by means of said control server".

According to a second embodiment herein, the object is achieved by an interaction test system as discussed above. Similar advantages as those mentioned in the foregoing in relation to the first embodiment correspondingly apply to the second embodiment, which is why these advantages are not further discussed. According to a third embodiment herein, the object is achieved by a computer program product comprising a computer program containing computer program code means arranged to cause a computer or a processor to execute the steps of the interaction test system discussed above, stored on a computer-readable medium or a carrier wave. Yet again, similar advantages as those mentioned in the foregoing in relation to the first embodiment correspondingly apply to the third embodiment, which is why these advantages are not further discussed.

BRIEF DESCRIPTION OF THE DRAWINGS

The various non-limiting embodiments of the disclosure, including particular features and advantages, will be readily understood from the following detailed description and the accompanying drawings, in which:

FIGS. 3a-c illustrates schematic overviews of alternative mixed realities according to exemplifying embodiments of the disclosure;

DETAILED DESCRIPTION

Figure 1:
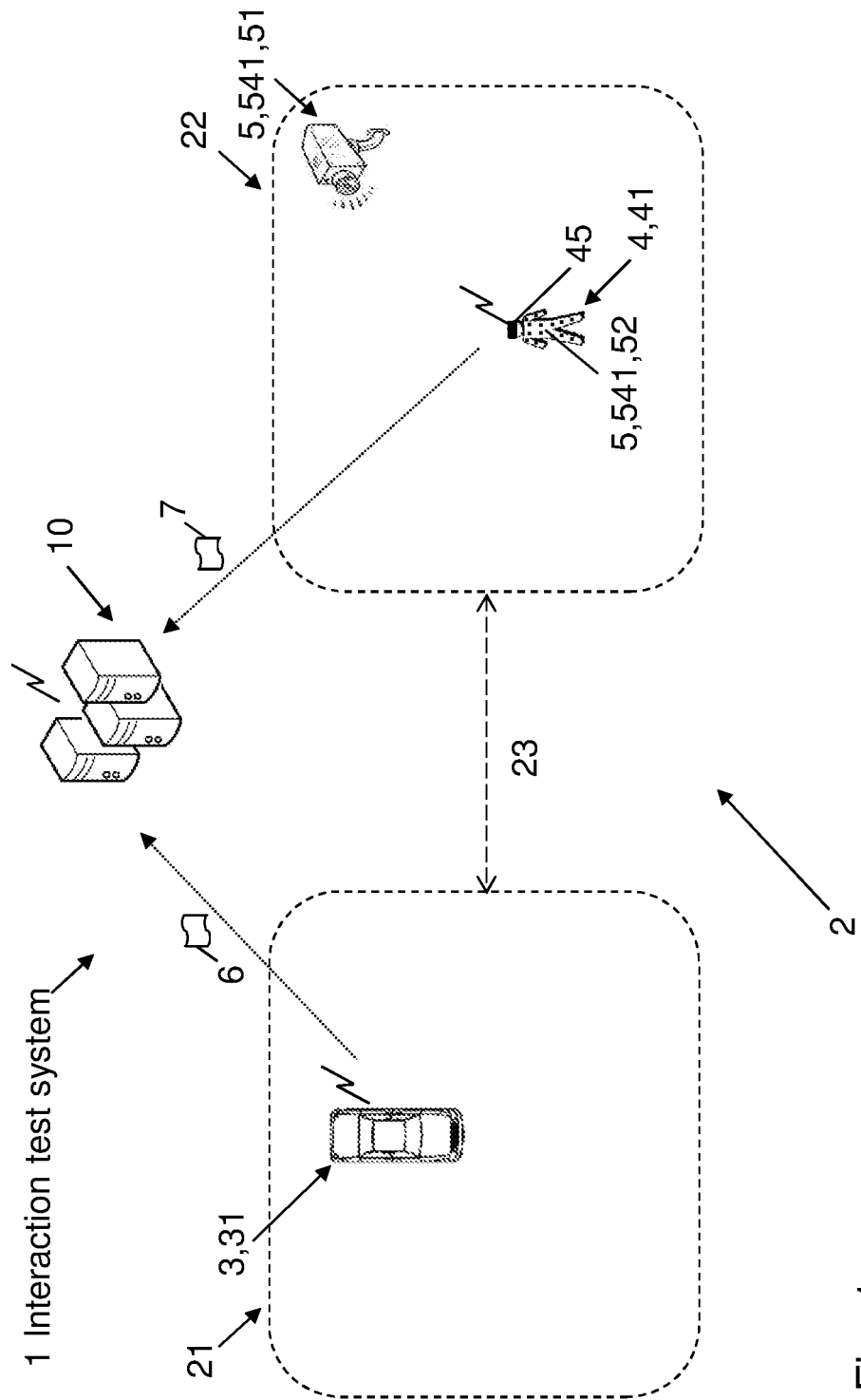
FIG. 1 illustrates a schematic overview of an exemplifying interaction test system according to embodiments of the disclosure.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which embodiments of the disclosure are shown. This disclosure may, however, be embodied in many different forms and should not be construed as limited to the embodiments set forth herein. Like reference characters refer to like elements throughout, and reference characters followed by one or more apostrophes refer to elements resembling elements previously discussed. Dashed lines of some boxes in the figures indicate that these units or actions are optional and not mandatory. In the following, according to embodiments herein which relate to enabling interaction in a test environment between a first test object comprising a vehicle, and at least a second test object, there will be disclosed an approach enabling safe testing, e.g. of a high risk scenario, involving a test vehicle and one or more other test objects.

Referring now to the figures and FIG. 1 in particular, there is illustrated a schematic overview of an exemplifying interaction test system 1 according to embodiments of the disclosure. The interaction test system 1—which optionally may be at least partly comprised in one or more control servers 10—is adapted for enabling interaction in a test environment 2 between a first test object 3 comprising a vehicle 31, and at least a second test object 4. The at least second test object 4 is adapted to communicate directly or indirectly—e.g. via the control server(s) 10—with the first test object 3. During a test session, the first test object 3 acts within a first physical test environment 21 and said at least second test object acts within at least a second physical test environment 22 physically separated from said first test environment 21. In the shown exemplifying embodiment, the vehicle 31 is a passenger car adapted to support driving assistance functionality, the first physical test environment 21 is represented by an outdoor open test area and the second physical test environment 22 represented by another outdoor open test area physically separated from the first test environment 21, e.g. by a minimum distance 23. The second test object 4 is here represented by and/or comprises a vulnerable road user (VRU) 41, carrying a head mounted display (HMD) 45. Further shown, in the second physical test environment 22, is an exemplifying motion capture system 5—here a VRU motion capture system 541—comprising one or more cameras 51 visually sensing test objects 3, 4, here the VRU 41. Additionally, or alternatively, the motion capture system 5 comprises a wearable motion capture system 52 carried by a test object 3, 4—here the VRU 41. Moreover, shown is derived first object data 6 associated with the first test object 3, which first object data 6 comprises status information and/or actions of the first test object 3, here the vehicle 31. Similarly shown is derived at least second object data 7 associated with the at least second test object 4, which at least second object data 7 comprises status information and/or actions of the at least second test object 4, here the VRU 41.

Figure 2:
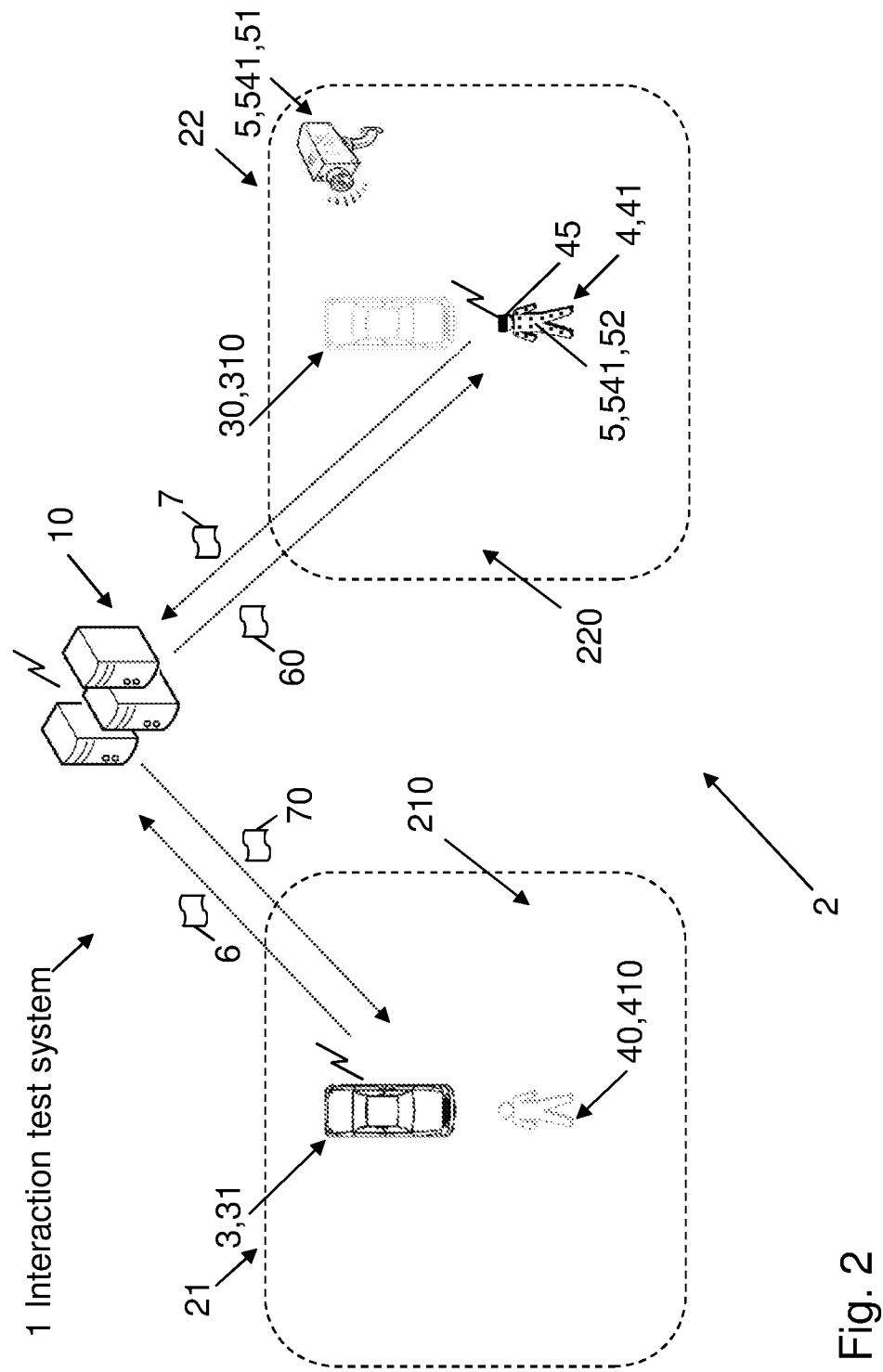
FIG. 2 illustrates a schematic overview of mixed realities according to exemplifying embodiments of the disclosure, which may result from the conditions of FIG. 1.

FIG. 2 illustrates a schematic overview of exemplifying mixed realities according to exemplifying embodiments of the disclosure, which may result from the conditions of FIG. 1; a mixed reality 210 as perceived by the first test object 3—here the vehicle 31 and/or a user thereof—and a mixed reality 220 as perceived by the at least second test object 4—here VRU 41 and/or the HMD 45 carried by the VRU 41. Shown in FIG. 2 is first object behavior data 60 which is based on the first object data 6, and at least second object behavior data 70 which is based on the at least second object data 7. Further visualized in the mixed reality 220 as perceived by the at least second test object 4 is an exemplifying a virtual replica 30 of the first test object 3, here a virtual replica 310 of the vehicle 31, and visualized in the mixed reality 210 as perceived by the first test object 3 is an exemplifying virtual replica 40 of the at least second test object 4, here a virtual replica 410 of the VRU 41.

FIG. 3a illustrates schematic overviews of exemplifying alternative mixed realities according to exemplifying embodiments of the disclosure. In the shown embodiment, the first test object 3, here comprising the vehicle 31 discussed above, additionally comprises a vehicle occupant 311, which vehicle occupant carries a HMD (not shown). The first physical test environment 21 here comprises, similar to the second physical test environment 22, a motion capture system 5—here a first motion capture system 53—comprising one or more cameras 51, here visually sensing said vehicle occupant 311. Additionally, or alternatively, said first motion capture system 53 comprises a wearable motion capture system 52 here carried by the vehicle occupant 311. Moreover, shown is optional vehicle data 61 derived from the vehicle 31 and additional or alternative optional occupant data 62 derived from the first motion capture system 53 carried by 52, and/or visually sensing 51, the vehicle occupant 311. The vehicle data 61 comprises status information and/or actions of the vehicle 31 and the occupant data 62 comprises status information and/or actions of the vehicle occupant 311. Further shown in FIG. 3a is optional vehicle behavior data 610 which is based on the vehicle data 61 and additional or alternative optional occupant behavior data 620 which is based on the occupant data 62. Additionally, shown is how one or more optional action instructions may be provided to one or more of the test objects 3, 4; an action instruction 75 to the first test object 3, here the car 31, and/or an action instruction 65 to the at least second test object 4, here the VRU 41. The exemplifying interaction test system 1 of FIG. 3a further comprises at least a first optional auxiliary object 8, here a traffic light arrangement 81, which auxiliary object 8 is adapted to during the test session act within the first 21 and/or the second physical test environment 22. The at least first auxiliary object 8, which here is acting within the second test environment 22, is adapted to communicate directly or indirectly—e.g. via the control server 10—with the first test object 3, here the vehicle 31 and/or the vehicle occupant 311, and/or with the at least second test object 4, here the VRU 41. Further shown is optional derived auxiliary object data 9 associated with the at least first auxiliary test object 8, which auxiliary object data 9 comprises status information and/or actions of the auxiliary object 8, here the traffic lights arrangement 81. Additionally, shown is optional auxiliary object behavior data 90, which is based on the auxiliary object data 9. Further visualized in the mixed reality 210 as perceived by the first test object 3—here the vehicle 31, the vehicle occupant 311 thereof and/or the HMD carried by the vehicle occupant 31—is an exemplifying virtual replica 80 of the at least first auxiliary object 8, here a virtual replica 810 of the traffic light arrangement 81.

Figure 3B:
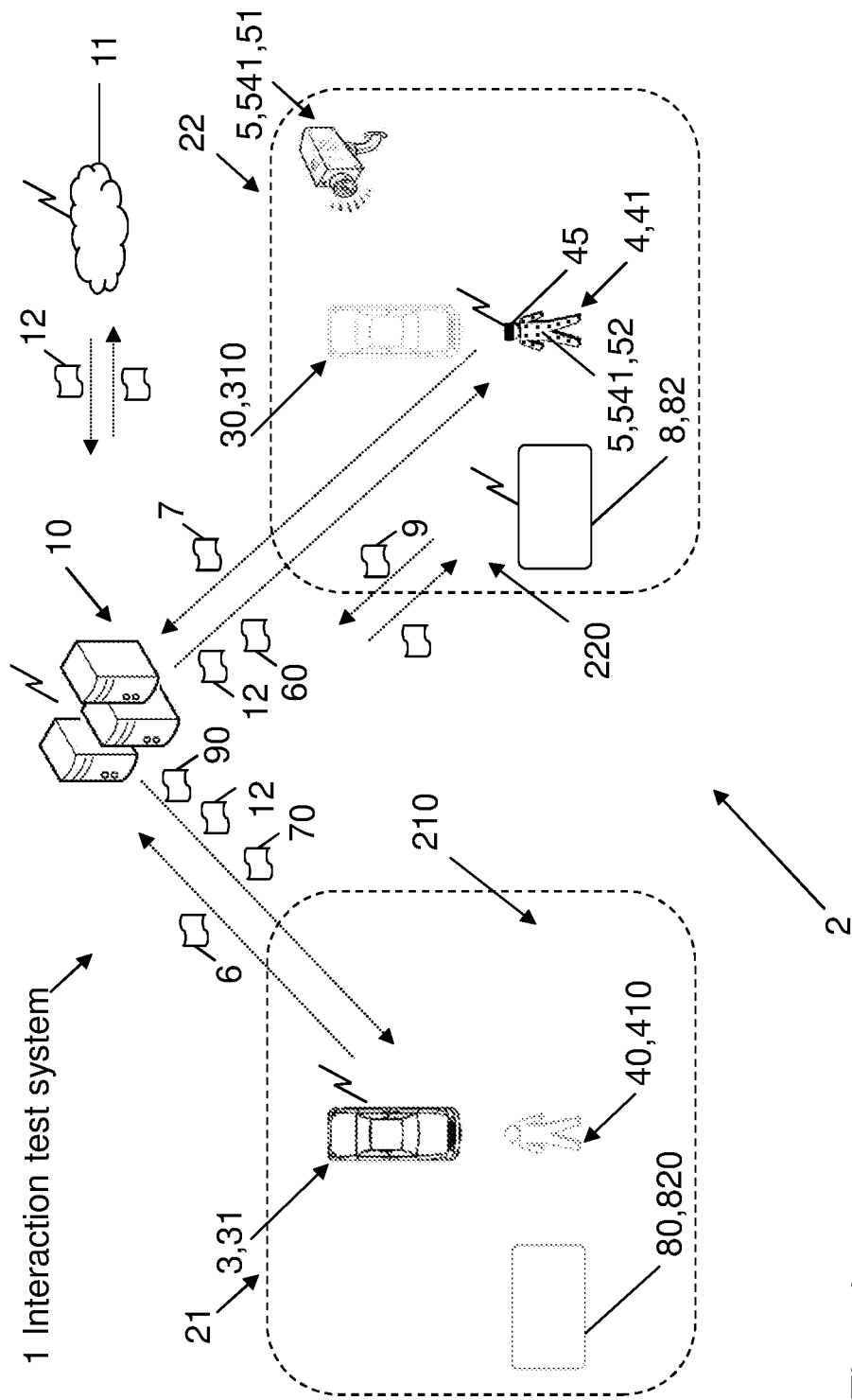

FIG. 3b illustrates schematic overviews of exemplifying other alternative mixed realities according to exemplifying embodiments of the disclosure. In the shown embodiment, the optional auxiliary object 8 is represented by a robot vehicle 82. The auxiliary object data 9 here comprises status information and/or actions of the robot vehicle 82, and moreover, the exemplifying virtual replica 80 of the at least first auxiliary object 8 is here represented by a virtual replica 820 of the robot vehicle 82. Further shown in FIG. 3b is an optional cloud service 11, from which environment conditions data 12 may be derived. The environment conditions data 12 comprises one or more environment conditions associated with the first 21 or the at least second physical test environment 22.

Figure 3C:
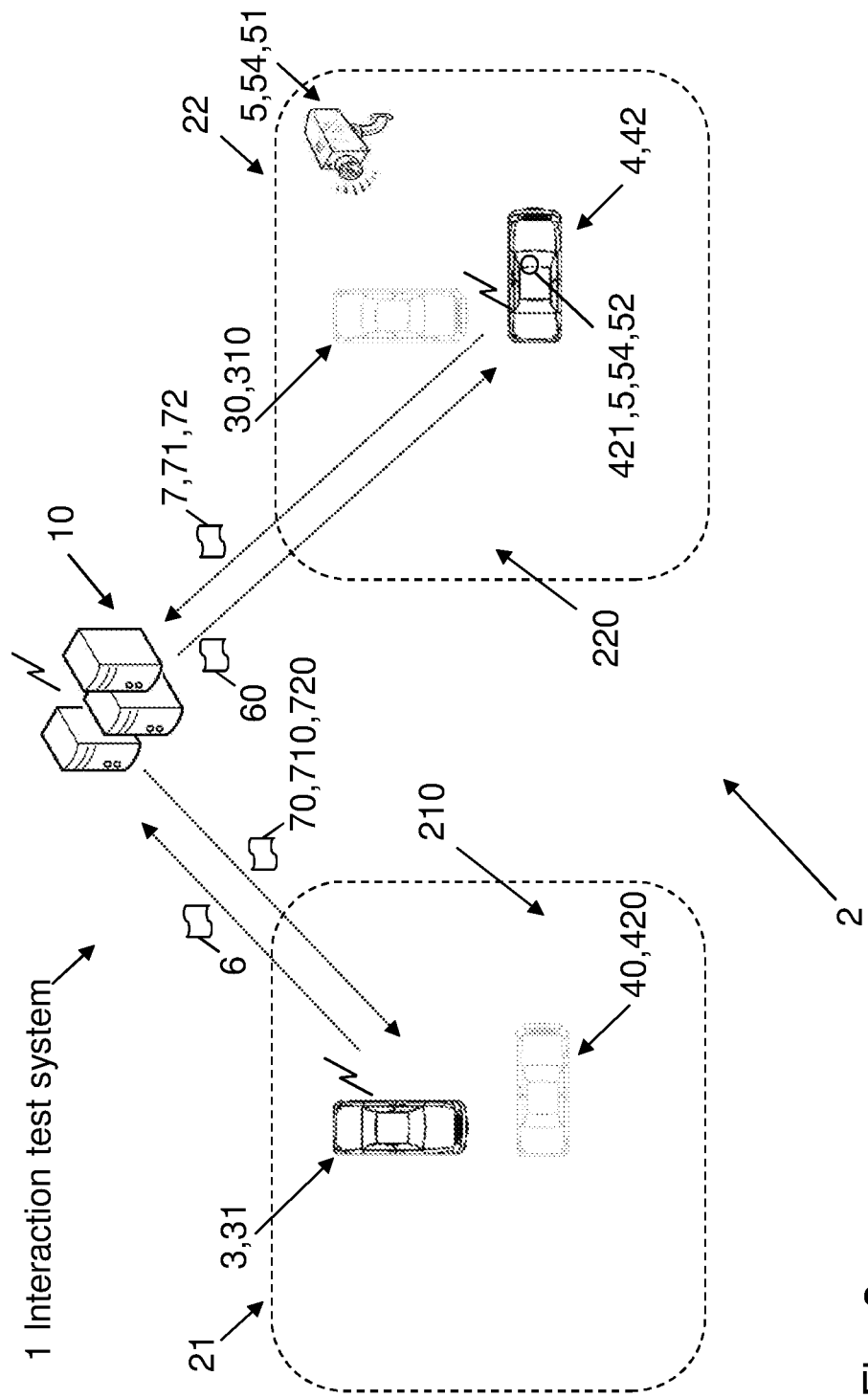

FIG. 3c illustrates schematic overviews of exemplifying yet other alternative mixed realities according to exemplifying embodiments of the disclosure. In the shown embodiment, the at least second test object 4—or a further test object—comprises a second vehicle 42 and a vehicle occupant thereof, i.e. a second vehicle occupant 421, which second vehicle occupant 421 carries a HMD (not shown). The motion capture system 5 of the second physical test environment 22 here comprises a second motion capture system 54 which may comprise one or more cameras 51, here visually sensing the second vehicle occupant 421 and optionally additionally the second vehicle 42. Additionally or alternatively, said second motion capture system 54 comprises a wearable motion capture system 52 here carried by the second vehicle occupant 421. Moreover, shown is optional second vehicle data 71 derived from the second vehicle 42 and additional or alternative optional second occupant data 72 derived from the second motion capture system 54 carried by 52, and/or visually sensing 51, the second vehicle occupant 421. The second vehicle data 71 comprises status information and/or actions of the second vehicle 42 and the second occupant data 72 comprises status information and/or actions of the second vehicle occupant 421. Further shown in FIG. 3c is optional second vehicle behavior data 710 which is based on the second vehicle data 71 and additional or alternative optional second occupant behavior data 720 which is based on the second occupant data 72.

As further shown in FIG. 4, which depicts a schematic block diagram illustrating an exemplifying interaction test system 1 according to embodiments of the disclosure, the interaction test system 1 comprises a virtual reality providing unit 102, a data deriving unit 103 and a behavior data providing unit 104, all of which will be described in greater detail further on. The interaction test system 1 may furthermore comprise an optional actions instruction providing unit 101, an optional action behavior determining unit 105, an optional data parameter adapting unit 106, an optional environment conditions data deriving unit 107 and/or an optional environment conditions providing unit 108, which similarly will be described in greater detail further on. Furthermore, the embodiments herein for enabling interaction in a test environment 2 between a first test object 3 comprising a vehicle 31, and at least a second test object 4, may be implemented through one or more processors, such as a processor 109, here denoted CPU—for instance implemented in a single and/or multi-threaded parallel computing environment for CPU and/or GPU ("graphics processing unit")—together with computer program code for performing the functions and actions of the embodiments herein. Said program code may also be provided as a computer program product, for instance in the form of a data carrier carrying computer program code for performing the embodiments herein when being loaded into the interaction test system 1. One such carrier may be in the form of a CD ROM disc. It is however feasible with other data carriers such as a memory stick. The computer program code may furthermore be provided as pure program code on a server and downloaded to the interaction system 1. The interaction test system 1 may further comprise a memory 110 comprising one or more memory units; additionally, or alternatively a hard drive, a solid state disk, a flash memory, a GPU memory or the like. The memory 110 may be arranged to be used to store e.g. information, and further to store data, configurations, schedulings, and applications, to perform the methods herein when being executed in the interaction test system 1. Furthermore, one or more of the units 101-108 discussed above, the processor 109 and/or the memory 110, may for instance be implemented in one or several control servers 2, in the first test object 3 and/or in the at least second test object 4—such as in one or more electronic control units (ECUs) thereof—and/or in one or more mobile units which may be carried on-board, be mounted to and/or be integrated with the first test object 3 and/or the at least second test object 4. Those skilled in the art will also appreciate that one or more of the units 101-108 discussed above, and which will be described in more detail later on in this description, may refer to a combination of analog and digital circuits, and/or one or more processors configured with software and/or firmware, e.g. stored in a memory such as the memory 110, that when executed by the one or more processors such as the processor 109 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 4:
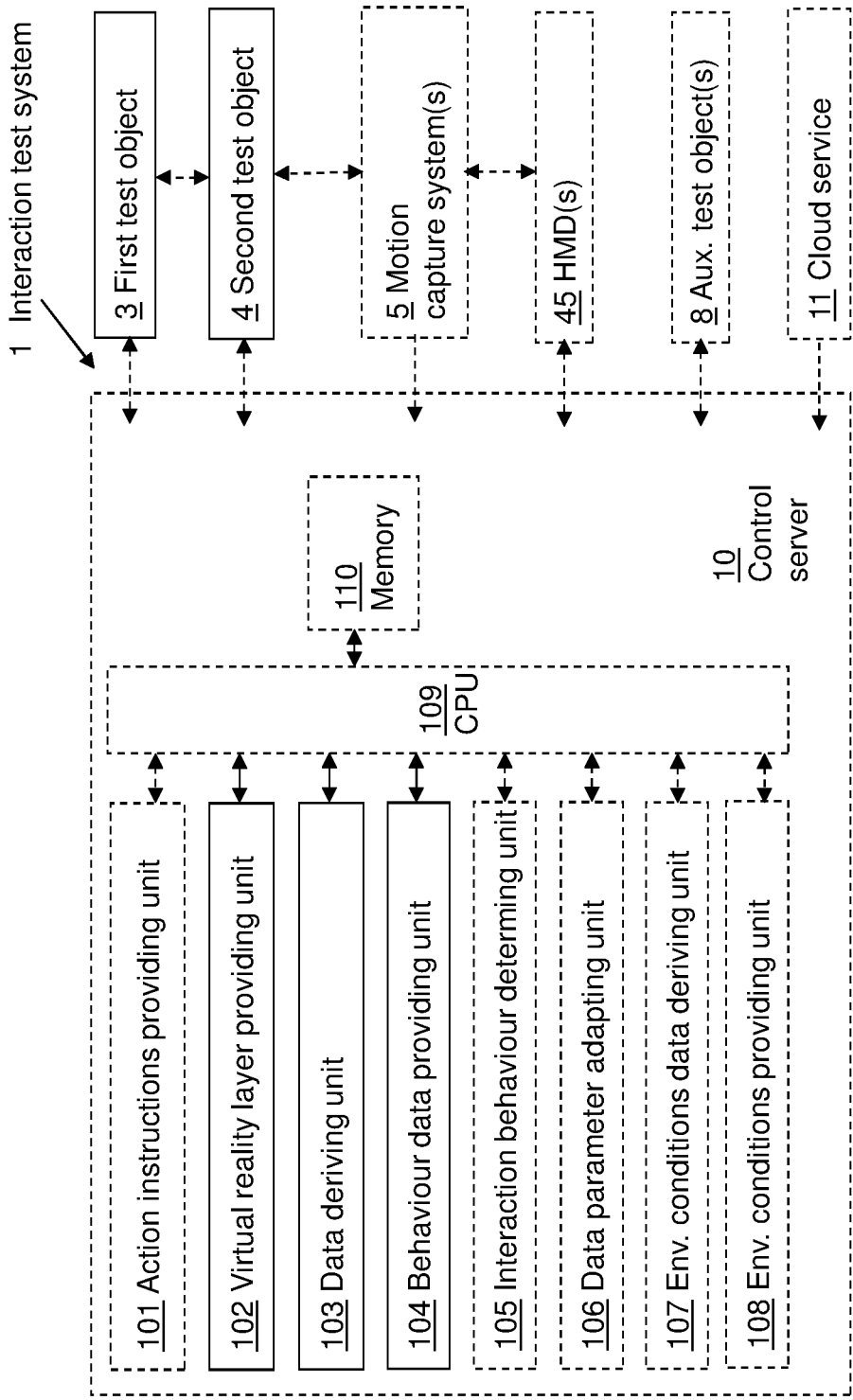
FIG. 4 is a schematic block diagram illustrating an exemplifying interaction test system according to embodiments of the disclosure.
Figure 5:
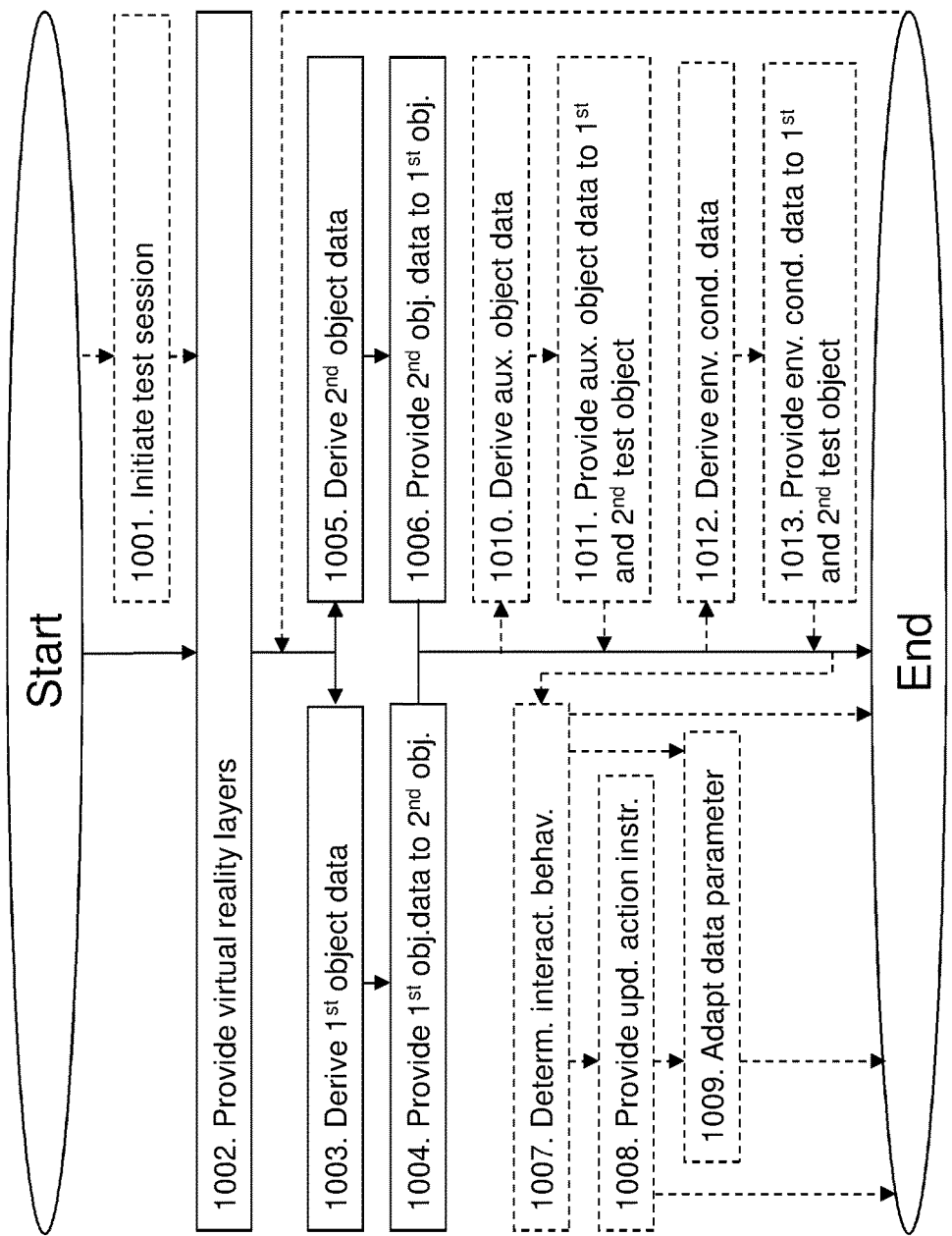
FIG. 5 is a flowchart depicting an exemplifying method of an interaction test system according to embodiments of the disclosure.

FIG. 5 is a flowchart depicting an exemplifying method of an interaction test system 1 according to embodiments of the disclosure. The method—which is performed by the interaction test system 1—is for enabling interaction in the test environment 2 between the first test object 3 comprising the vehicle 31, and the at least second test object 4 adapted to communicate directly or indirectly with the first test object 3. During a test session, the first test object 3 acts within the first physical test environment 21 and the at least second test object 4 acts within the at least second physical test environment 22 physically separated from the first test environment 21. The exemplifying method, which may be continuously repeated, comprises the following actions discussed with support from FIGS. 1-4. The actions may be taken in any suitable order, for instance may Action 1003 and 1005 be performed simultaneously and/or in an alternate order.

In optional action 1001, the interaction test system 1 may initiate the test session, e.g. by means of the action instructions providing unit 101, as shown with support at least from FIG. 4. Initiating the test session may further optionally comprise providing—e.g. by means of the control server 2—one or more initial action instructions to the first 3 and/or at least second test object 4.

In Action 1002, the interaction test system 1 provides—e.g. by means of the virtual reality layer providing unit 102—a first virtual reality layer associated with the first test environment 21, to the first test object 3, and at least a second virtual reality layer associated with the at least second test environment 22, to the at least second test object 4, such that the mixed reality 210 perceived by the first test object 3 corresponds to the mixed reality 220 perceived by the at least second test object 4, as shown with support at least from FIGS. 1, 2 and 4.

Optionally, should the first test object 3 additionally comprise a vehicle occupant 311, providing the first virtual reality layer then comprises providing—e.g. by means of the virtual reality layer providing unit 102—a first vehicle virtual reality layer to the vehicle 311 and/or a first occupant virtual reality layer to a head-mounted display (HMD) carried by the vehicle occupant, as shown with support at least from FIG. 3a.

Moreover, optionally, should the second test object 4 or a further test object comprise a VRU 41, providing the at least second virtual reality layer then comprises providing—e.g. by means of the virtual reality layer providing unit 102—a VRU virtual reality layer to the HMD 45 carried by the VRU 41, as shown with support at least from FIG. 2.

Furthermore, optionally, should the second test object 4 or a further test object comprise a second vehicle 42 and a vehicle occupant 421 thereof, providing the at least second virtual reality layer then comprises providing—e.g. by means of the virtual reality layer providing unit 102—a second vehicle virtual reality layer to the second vehicle 42 and/or a second occupant virtual reality layer to the HMD carried by the vehicle occupant 421 of the second vehicle 42, as shown with support at least from FIG. 3c.

In Action 1003, the interaction test system 1—continuously, periodically, or intermittently—derives—e.g. by means of the data deriving unit 103—first object data 6 associated with the first test object 3, which first object data 6 comprises status information and/or actions of the first test object 3, as shown with support at least from FIGS. 1 and 4.

Optionally, should the first test object 3 additionally comprise a vehicle occupant 311, deriving first object data 6 then comprises deriving—e.g. by means of the data deriving unit 103—vehicle data 61 from the vehicle 31, and/or occupant data 62 from the first motion capture system 53 carried by 52, and/or visually sensing 51, the vehicle occupant 311, which vehicle data 61 comprises status information and/or actions of the vehicle 31 and which occupant data 62 comprises status information and/or actions of the vehicle occupant 311, as shown with support at least from FIG. 3a.

In Action 1004, the interaction test system 1—continuously, periodically, or intermittently—provides—e.g. by means of the behavior data providing unit 104—first object behavior data 60 based on the first object data 6, to the at least second virtual reality layer, such that at least a portion of the status information and/or actions of the first test object 3, are comprised in the mixed reality 220 perceived by the at least second test object 4, as shown with support at least from FIGS. 2 and 4.

Optionally, should the first test object 3 additionally comprise a vehicle occupant 311, providing first object behavior data 60 then comprises providing—e.g. by means of the behavior data providing unit 104—vehicle behavior data 610 based on the vehicle data 61 and/or occupant behavior data 620 based the occupant data 62, to the at least second virtual reality layer, such that at least a portion of the status information and/or actions of the vehicle 31 and/or the vehicle occupant 311, are comprised in the mixed reality 220 perceived by the at least second test object 4, as shown with support at least from FIG. 3a.

Moreover, optionally, should the second test object 4 or a further test object comprise the second vehicle 42 and the vehicle occupant 421 thereof, providing first object behavior data 60 then comprises providing first object behavior data 60 based on the first object data 6, to the second vehicle virtual reality layer and/or the second occupant virtual reality layer, such that at least a portion of the status information and/or actions of the first test object 3, is comprised in the mixed reality 220 perceived by the second vehicle 42 and/or in the mixed reality 220 perceived by the HMD carried by the vehicle occupant 421 of the second vehicle 42, as shown with support at least from FIG. 3c In Action 1005, the interaction test system 1—continuously, periodically, or intermittently—derives—e.g. by means of the data deriving unit 103—at least second object data 7 associated with the at least second test object 4, which at least second object data 7 comprises status information and/or actions of the at least second test object 4, as shown with support at least from FIGS. 1 and 4.

Optionally, should the second test object 4 or a further test object comprise a VRU 41, deriving at least second object data 7 then comprises deriving—e.g. by means of the data deriving unit 103—the second object data 7 from the VRU motion capture system 541 carried by 52, and/or visually sensing 51, the VRU 41, as shown with support at least from FIG. 1.

Moreover, optionally, should the second test object 4 or a further test object comprise the second vehicle 42 and the vehicle occupant 421 thereof, deriving at least second object data 7 then comprises deriving—e.g. by means of the data deriving unit 103—second vehicle data 71 from the second vehicle 42, and/or second occupant data 72 from the second motion capture system 54 carried by 52, and/or visually sensing 51, the vehicle occupant 421 of the second vehicle 42, which second vehicle data 71 comprises status information and/or actions of the second vehicle 42 and which second occupant data 72 comprises status information and/or actions of the vehicle occupant 421 of the second vehicle 42, as shown with support at least from FIG. 3c.

In Action 1006, the interaction test system 1—continuously, periodically, or intermittently—provides—e.g. by means of the behavior data providing unit 104—at least second object behavior data 70 based on the at least second object data 7, to the first virtual reality layer, such that at least a portion of the status information and/or actions of the at least second test object 4 are comprised in the mixed reality 210 perceived by the first test object 3, as shown at least with support from FIGS. 2 and 4.

Optionally, should the first test object 3 additionally comprise a vehicle occupant 311, providing at least second object behavior data 70 then comprises providing—e.g. by means of the behavior data providing unit 104—at least second object behavior data 70 based on the at least second object data 7, to the first vehicle virtual reality layer and/or the first occupant virtual reality layer, such that at least a portion of the status information and/or actions of the at least second test object 4 are comprised in the mixed reality 210 perceived by the vehicle 31 and/or in the mixed reality 210 perceived by the vehicle occupant 311, as shown with support at least from FIG. 3a.

Moreover, optionally, should the second test object 4 or a further test object comprise the second vehicle 42 and the vehicle occupant 421 thereof, providing at least second object behavior data 70 then comprises providing—e.g. by means of the behavior data providing unit 104—second vehicle behavior data 710 based on said second vehicle data 71 and/or second occupant behavior data 720 based on the second occupant data 72, to the first virtual reality layer, such that at least a portion of the status information and/or actions of the second vehicle 42 and/or the second occupant 421, are comprised in the mixed reality 410 perceived by the first test object 3, as shown with support at least from FIG. 3c.

In optional Action 1007, the interaction test system 1 may determine—e.g. by means of the interaction behavior determining unit 105—an interaction behavior of the first test object 3 and/or the at least second test object 4, based on the derived first object data 6 and/or the derived at least second object data 7, as shown with support at least from FIGS. 1 and 4.

In optional Action 1008, optionally following upon optional Action 1007, the interaction test system 1 may provide—e.g. by means of the data parameter adapting unit 106—based on the determined interaction behavior, an action instruction 65, 75 to the first 3 and/or the at least second test object 4, as shown with support at least from FIGS. 1, 3a and 4.

In optional Action 1009, optionally following upon optional Action 1007, the interaction test system 1 may adapt—e.g. by means of the data parameter adapting unit 106—based on the determined interaction behavior, a data parameter of the first 3 and/or at least second test object 4, which data parameter is associated with driving assistance functionality, as shown with support at least from FIGS. 1, 2 and 4.

During the test session, the at least a first auxiliary object 8, 81, 82 may act within the first 21 and/or the at least second physical test environment 22, which at least first auxiliary object 8, 81, 82 is adapted to communicate directly or indirectly with the first test object 3 and/or the at least second test object 4. Accordingly, in optional Action 1010, the interaction test system 1 may—continuously, periodically, or intermittently—derive—e.g. by means of the data deriving unit 103—auxiliary object data 9 associated with the at least first auxiliary object 8, 81, 82, which auxiliary object data 8, 81, 82 comprises status information and/or actions of the auxiliary object 8, 81, 82, as shown with support at least from FIGS. 3b and 4.

In optional Action 1011, following upon optional Action 1010, the interaction test system 1 may—continuously, periodically, or intermittently—provide—e.g. by means of the behavior data providing unit 104—auxiliary object behavior data 90 based on the auxiliary object data 9, to the first and/or the at least second virtual reality layer, such that at least a portion of the status information and/or actions of the at least first auxiliary object 8, 81, 82 are comprised in the mixed reality 210 perceived by the first test object 3 and/or in the mixed reality 220 perceived by the at least second test object 4, as shown with support at least from FIGS. 3*b* and 4.

In optional Action 1012, the interaction test system 1 may derive—e.g. by means of the environment conditions data deriving unit 107—environment conditions data 12 from the cloud service 11, which environment conditions data 12 comprises one or more environment conditions associated with the first 21 and/or at least second physical test environment 22, as shown with support at least from FIGS. 3*b* and 4.

In optional Action 1013, following upon optional Action 1012, the interaction test system 1 may provide—e.g. by means of the environment conditions providing unit 108—the environment conditions data 12 to the first test object 3, the first virtual layer, the at least second test object 4 and/or the at least second virtual layer, such that the environment conditions data 12 are comprised in the mixed reality 210 perceived by the first test object 3 and/or in the mixed reality 220 perceived by the at least second test object, as shown with support at least from FIG. 3*b*.

The person skilled in the art realizes that the present disclosure by no means is limited to the embodiments described above. On the contrary, many modifications and variations are possible within the scope of the appended claims. Furthermore, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by an interaction test system for enabling interaction in a test environment between a first test object comprising a vehicle, and at least a second test object adapted to communicate directly or indirectly with the first test object, wherein during a test session, the first test object acts within a first physical test environment and the at least second test object acts within at least a second physical test environment physically separated from the first test environment, the method comprising:
   providing a first virtual reality layer associated with the first test environment to the first test object, and at least a second virtual reality layer associated with the at least second test environment to the at least second test object, such that a mixed reality perceived by the first test object corresponds to a mixed reality perceived by the at least second test object; and
   continuously, periodically, or intermittently:
   deriving first object data associated with the first test object, the first object data comprising status information and/or actions of the first test object;
   providing first object behavior data based on the first object data to the at least second virtual reality layer, such that at least a portion of the status information and/or actions of the first test object are comprised in the mixed reality perceived by the at least second test object;
   deriving at least second object data associated with the at least second test object, the at least second object data comprising status information and/or actions of the at least second test object; and
   providing at least second object behavior data based on the at least second object data to the first virtual reality layer, such that at least a portion of the status information and/or actions of the at least second test object are comprised in the mixed reality perceived by the first test object.

2. The method according to claim 1 further comprising:
   determining an interaction behavior of the first test object and/or the at least second test object, based on the derived first object data and/or the derived at least second object data; and
   based on the interaction behavior:
   providing an action instruction to the first and/or the at least second test object, and/or
   adapting a data parameter of the first and/or at least second test object, the data parameter being associated with driving assistance functionality.

3. The method according to claim 1 wherein the first test object additionally comprises a vehicle occupant;
   wherein the providing the first virtual reality layer comprises providing a first vehicle virtual reality layer to the vehicle and/or a first occupant virtual reality layer to a head-mounted display (HMD) carried by the vehicle occupant;
   wherein the deriving first object data comprises deriving vehicle data from the vehicle, and/or occupant data from a first motion capture system carried by, and/or visually sensing, the vehicle occupant, the vehicle data comprising status information and/or actions of the vehicle and the occupant data comprising status information and/or actions of the vehicle occupant;
   wherein the providing first object behavior data comprises providing vehicle behavior data based on the vehicle data and/or occupant behavior data based the occupant data, to the at least second virtual reality layer, such that at least a portion of the status information and/or actions of the vehicle and/or the vehicle occupant, are comprised in the mixed reality perceived by the at least second test object; and
   wherein the providing at least second object behavior data comprises providing at least second object behavior data based on the at least second object data, to the first vehicle virtual reality layer and/or the first occupant virtual reality layer, such that at least a portion of the status information and/or actions of the at least second test object are comprised in the mixed reality perceived by the vehicle and/or in the mixed reality perceived by the vehicle occupant.

4. The method according to claim 1 wherein the second test object or a further test object comprises a vulnerable road user (VRU);
   wherein the providing the at least second virtual reality layer comprises providing a VRU virtual reality layer to an HMD carried by the VRU; and
   wherein the deriving at least second object data comprises deriving the second object data from a VRU motion capture system carried by, and/or visually sensing, the VRU.

5. The method according to claim 1 wherein the second test object or a further test object comprises a second vehicle and a vehicle occupant thereof;
- wherein the providing the at least second virtual reality layer comprises providing a second vehicle virtual reality layer to the second vehicle and/or a second occupant virtual reality layer to an HMD carried by the vehicle occupant of the second vehicle;
- wherein the providing first object behavior data comprises providing first object behavior data based on the first object data, to the second vehicle virtual reality layer and/or the second occupant virtual reality layer, such that at least a portion of the status information and/or actions of the first test object, is comprised in the mixed reality perceived by the second vehicle and/or in the mixed reality perceived by the HMD carried by the vehicle occupant of the second vehicle; and
- wherein the deriving at least second object data comprises deriving second vehicle data from the second vehicle, and/or second occupant data from a second motion capture system carried by, and/or visually sensing, the second vehicle occupant, the second vehicle data comprising status information and/or actions of the second vehicle and the second occupant data comprising status information and/or actions of the second vehicle occupant; and
- wherein the providing at least second object behavior data comprises providing second vehicle behavior data based on the second vehicle data and/or occupant behavior data based on the second occupant data, to the first virtual reality layer, such that at least a portion of the status information and/or actions of the second vehicle and/or the second vehicle occupant, are comprised in the mixed reality perceived by the first test object.

6. The method according to claim 1 wherein:
- during the test session, at least a first auxiliary object acts within the first and/or the at least second physical test environment, the at least first auxiliary object being adapted to communicate directly or indirectly with the first test object and/or the at least second test object;
- the method further comprising, continuously, periodically, or intermittently:
- deriving auxiliary object data associated with the at least first auxiliary object, the auxiliary object data comprising status information and/or actions of the auxiliary object; and
- providing auxiliary object behavior data based on the auxiliary object data, to the first and/or the at least second virtual reality layer, such that at least a portion of the status information and/or actions of the at least first auxiliary object are comprised in the mixed reality perceived by the first test object and/or in the mixed reality perceived by the at least second test object.

7. The method according to claim 1 further comprising:
- deriving environment conditions data from a cloud service, the environment conditions data comprising one or more environment conditions associated with the first and/or at least second physical test environment; and
- providing the environment conditions data to the first test object, the first virtual layer, the at least second test object and/or the at least second virtual layer, such that the environment conditions data are comprised in the mixed reality perceived by the first test object and/or in the mixed reality perceived by the at least second test object.

8. An interaction test system adapted for enabling interaction in a test environment between a first test object comprising a vehicle, and at least a second test object adapted to communicate directly or indirectly with the first test object, wherein during a test session, the first test object acts within a first physical test environment and the at least second test object acts within at least a second physical test environment physically separated from the first test environment, the interaction test system comprising:
- a virtual reality layer providing unit adapted for providing a first virtual reality layer associated with the first test environment to the first test object, and at least a second virtual reality layer associated with the at least second test environment, to the at least second test object, such that a mixed reality perceived by the first test object corresponds to a mixed reality perceived by the at least second test object; and
- a data deriving unit adapted for deriving continuously, periodically, or intermittently first object data associated with the first test object, the first object data comprising status information and/or actions of the first test object;
- a behavior data providing unit adapted for providing continuously, periodically, or intermittently first object behavior data based on the first object data to the at least second virtual reality layer, such that at least a portion of the status information and/or actions of the first test object are comprised in the mixed reality perceived by the at least second test object;
- wherein the data deriving unit further is adapted for deriving at least second object data associated with the at least second test object, the at least second object data comprising status information and/or actions of the at least second test object; and
- wherein the behavior data providing unit further is adapted for providing continuously, periodically, or intermittently at least second object behavior data based on the at least second object data to the first virtual reality layer, such that at least a portion of the status information and/or actions of the at least second test object are comprised in the mixed reality perceived by the first test object.

9. The interaction test system according to claim 8 further comprising:
- an interaction behavior determining unit adapted for determining an interaction behavior of the first test object and/or the at least second test object, based on the derived first object data and/or the derived at least second object data; and
- an actions instruction providing unit adapted for providing, based on the interaction behavior, an action instruction to the first and/or the at least second test object, and/or
- a data parameter adapting unit adapted for adapting, based on the interaction behavior, a data parameter of the first and/or at least second test object, the data parameter being associated with driving assistance functionality.

10. The interaction test system according to claim 8 wherein the first test object additionally comprises a vehicle occupant;
- wherein the virtual reality layer providing unit further is adapted for providing a first vehicle virtual reality layer to the vehicle and/or a first occupant virtual reality layer to a head-mounted display (HMD) carried by the vehicle occupant;
- wherein the data deriving unit further is adapted for deriving vehicle data from the vehicle, and/or occupant data from a first motion capture system carried by, and/or visually sensing, the vehicle occupant, the vehicle data comprising status information and/or actions of the vehicle and the occupant data comprising status information and/or actions of the vehicle occupant;

wherein the behavior data providing unit further is adapted for providing vehicle behavior data based on the vehicle data and/or occupant behavior data based on the occupant data, to the at least second virtual reality layer, such that at least a portion of the status information and/or actions of the vehicle and/or the vehicle occupant, are comprised in the mixed reality perceived by the at least second test object; and wherein the behavior data providing unit further is adapted for providing at least second object behavior data based on the at least second object data, to the first vehicle virtual reality layer and/or the first occupant virtual reality layer, such that at least a portion of the status information and/or actions of the at least second test object are comprised in the mixed reality perceived by the vehicle and/or in the mixed reality perceived by the vehicle occupant.

11. The interaction test system according to claim 8 wherein the second test object or a further test object comprises a vulnerable road user (VRU);

wherein the virtual reality layer providing unit further is adapted for providing a VRU virtual reality layer to an HMD carried by the VRU; and wherein the data deriving unit further is adapted for deriving the second object data from a VRU motion capture system carried by, and/or visually sensing, the VRU.

12. The interaction test system according to claim 8 wherein the second test object or a further test object comprises a second vehicle and a vehicle occupant thereof;

wherein the virtual reality layer providing unit further is adapted for providing a second vehicle virtual reality layer to the second vehicle and/or a second occupant virtual reality layer to an HMD carried by the second vehicle occupant;

wherein the behavior data providing unit further is adapted for providing first object behavior data based on the first object data, to the second vehicle virtual reality layer and/or the second occupant virtual reality layer, such that at least a portion of the status information and/or actions of the first test object, is comprised in the mixed reality perceived by the second vehicle and/or in the mixed reality perceived by the HMD carried by the second vehicle occupant; and wherein the data deriving unit further is adapted for deriving second vehicle data from the second vehicle, and/or second occupant data from a second motion capture system carried by, and/or visually sensing, the second vehicle occupant, the second vehicle data comprising status information and/or actions of the second vehicle and the second occupant data comprising status information and/or actions of the second vehicle occupant; and wherein the behavior data providing unit further is adapted for providing second vehicle behavior data based on the second vehicle data and/or second occupant behavior data based on the second occupant data, to the first virtual reality layer, such that at least a portion of the status information and/or actions of the second vehicle and/or the second vehicle occupant, are comprised in the mixed reality perceived by the first test object.

13. The interaction test system according to claim 8 further comprising at least a first auxiliary object adapted to during the test session act within the first and/or the at least second test environment, the at least first auxiliary object being adapted to communicate directly or indirectly with the first test object and/or the at least second test object;

wherein the data deriving unit further is adapted for deriving, continuously, periodically, or intermittently, auxiliary object data associated with the at least first auxiliary object, the auxiliary object data comprising status information and/or actions of the auxiliary object; and wherein the behavior data providing unit further is adapted for providing, continuously, periodically, or intermittently, auxiliary object behavior data based on the auxiliary object data, to the first and/or the at least second virtual reality layer, such that at least a portion of the status information and/or actions of the at least first auxiliary object are comprised in the mixed reality perceived by the first test object and/or in the mixed reality perceived by the at least second test object.

14. The interaction test system according to claim 8 further comprising:

an environment conditions data deriving unit adapted for deriving environment conditions data from a cloud service, the environment conditions data comprising one or more environment conditions associated with the first and/or at least second test environment; and an environment conditions providing unit adapted for providing the environment conditions data to the first test object, the first virtual layer, the at least second test object and/or the at least second virtual layer, such that the environment conditions data are comprised in the mixed reality perceived by the first test object and/or in the mixed reality perceived by the at least second test object.

15. A computer readable storage medium having non-transitory computer executable instructions recorded thereon for use in an interaction test system for enabling interaction in a test environment between a first test object comprising a vehicle, and at least a second test object adapted to communicate directly or indirectly with the first test object, wherein during a test session, the first test object acts within a first physical test environment and the at least second test object acts within at least a second physical test environment physically separated from the first test environment, the computer executable instructions comprising instructions for:

providing a first virtual reality layer associated with the first test environment to the first test object, and at least a second virtual reality layer associated with the at least second test environment to the at least second test object, such that a mixed reality perceived by the first test object corresponds to a mixed reality perceived by the at least second test object; and continuously, periodically, or intermittently:

deriving first object data associated with the first test object, the first object data comprising status information and/or actions of the first test object;

providing first object behavior data based on the first object data to the at least second virtual reality layer, such that at least a portion of the status information and/or actions of the first test object are comprised in the mixed reality perceived by the at least second test object;

deriving at least second object data associated with the at least second test object, the at least second object data comprising status information and/or actions of the at least second test object; and providing at least second object behavior data based on the at least second object data to the first virtual reality layer, such that at least a portion of the status information and/or actions of the at least second test object are comprised in the mixed reality perceived by the first test object.

\* \* \* \* \*